(12) United States Patent
Eisenkrämer

(10) Patent No.: US 6,627,304 B1
(45) Date of Patent: Sep. 30, 2003

(54) ABSORBENT THIN-FILM SYSTEM CONSISTING OF METAL AND DIELECTRIC FILMS

(75) Inventor: Frank Eisenkrämer, Biebertal (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 0 days.

(21) Appl. No.: 09/402,748

(22) PCT Filed: Mar. 20, 1998

(86) PCT No.: PCT/DE98/00819

§ 371 (c)(1),
(2), (4) Date: Oct. 12, 1999

(87) PCT Pub. No.: WO98/49584

PCT Pub. Date: Nov. 5, 1998

(30) Foreign Application Priority Data

Apr. 30, 1997 (DE) .......................................... 197 18 146

(51) Int. Cl.⁷ ............................................... B32B 7/02
(52) U.S. Cl. ................ 428/216; 428/432; 428/433; 428/457; 428/663; 428/680; 428/699
(58) Field of Search ................ 428/433, 630, 428/632, 649, 680, 432, 663, 216, 457, 699

(56) References Cited

U.S. PATENT DOCUMENTS

| 3,781,089 A | 12/1973 | Fay et al. |
| 3,859,131 A | 1/1975 | Miles |
| 4,960,310 A | 10/1990 | Cushing |
| 5,046,834 A | 9/1991 | Dietrich |
| 5,217,832 A * | 6/1993 | Joslin et al. .................. 430/7 |

FOREIGN PATENT DOCUMENTS

DE           2848 294 A1      2/1980

* cited by examiner

*Primary Examiner*—Deborah Jones
*Assistant Examiner*—Andrew T Piziali
(74) *Attorney, Agent, or Firm*—Simpson & Simpson, PLLC

(57) ABSTRACT

The invention relates to an absorbent thin-film system made up of alternate metal and dielectric layers. With this system, color-neutral absorption results in the visual spectral region are obtained, as are a defined phase shift and a defined transmission. This film system is used for contrasting methods or contrasting systems in microscopy.

10 Claims, 2 Drawing Sheets

ABSORBENT THIN-FILM SYSTEM CONSISTING OF METAL AND DIELECTRIC FILMS

BACKGROUND OF THE INVENTION

The invention concerns an absorbing thin-layer system comprising multiple metallic and dielectric layers.

For a long time, modern techniques of microscopy have included "optical contrast" procedures such as dark field, oblique illumination, interference contrast, polarization contrast, relief contrast, and others. These procedures exploit certain physical properties of the microscopic preparation and provide a "contrasting" effect without any injury to the object being examined.

For instance, a Hoffmann modulation contrast system is known from U.S. Pat. No. 4,200,353. This procedure has the disadvantage that undesired color fringes appear because of the undefined phase status of a Hoffmann modulator. Also, disturbing reflections appear in the microscope beam path. They can be reduced by tilting the modulator strongly, but that would require a very demanding mechanical system in the objective lens.

SUMMARY OF THE INVENTION

Therefore the objective of this invention is to improve the image properties of a modulator for contrast processes in microscopy, thus avoiding the disadvantages of the known systems.

This objective is attained according to the invention by means of an absorbing thin-layer system comprising metallic and dielectric layers which has a defined phase shift to achieve color-neutral absorption in the visual spectral region, with low residual reflections at the same time. Other advantageous embodiments appear from the subclaims.

The invention is based on the finding that thin layers have a phase-shifting effect which depends on their chemical compositions, their refractive indices and their thicknesses.

BRIEF DESCRIPTION OF THE DRAWINGS

The nature and mode of operation of the present invention will now be more fully described in the following detailed description of the preferred embodiment taken with the accompanying drawing figures, in which.

DETAILED DESCRIPTION OF THE PREFERRED EMBODIMENT

Figure 1:
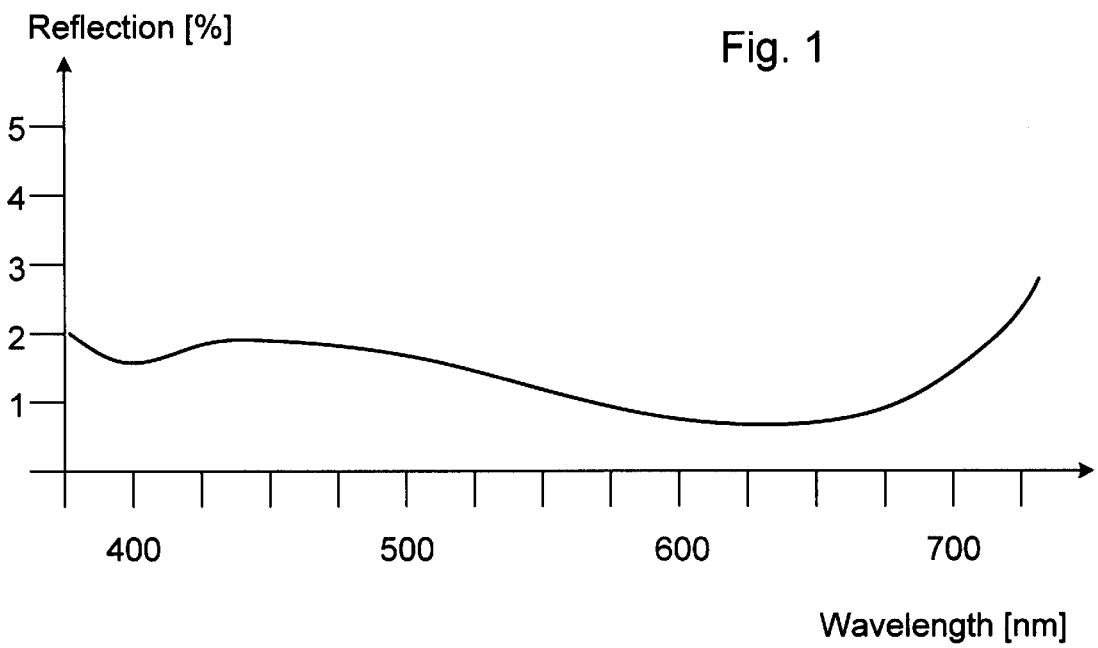
FIG. 1 is a graph of reflection as a function of wavelength over the visual spectral region for the thin-layer system according to the present invention.

FIG. 1 shows the structure of a layer system according to the invention. On a glass (carrier) plate which serves to a certain extent as the "substrate", there is Layer No. 1, a chromium layer 0.68 nm thick, followed by Layer No. 2, a substance "M2", 32.30 nm thick, with a refractive index of 1.65. Substance M2 is an evaporative chemical mixture commercially available from Merck KGaA of Darmstadt, Germany and has the chemical formula $La0.5_xAl_{1.5}O$. Layer No. 3 is nickel, 4.45 nm thick. It is followed by Layer No. 4, of magnesium fluoride, 57.31 nm thick with a refractive index of 1.38. Layer No. 5 is nickel, 1.89 nm thick, followed by Layer No. 6, which is again the substance "M2", 37.14 nm thick with a refractive index of 1.65. Layer No. 7 is another layer of magnesium fluoride with a refractive index of 1.38, 11.64 nm thick.

It has been found that deviations of about 10% in the thicknesses of the individual layers, and minor fluctuations in refractive index, do not impair the properties required. That is particularly the case for the amount of the phase shift.

While layers No. 4 to No. 7 make up the basis for the reflection-reducing action, it is found according to the invention that the layers numbered 1, 3 and 5 absorb the incident light such that the transmittance is attenuated neutrally over the entire visual range. Surprisingly, it is further found that layer No. 2 corrects the phase shift of the rest of the layer system to zero.

Figure 2:
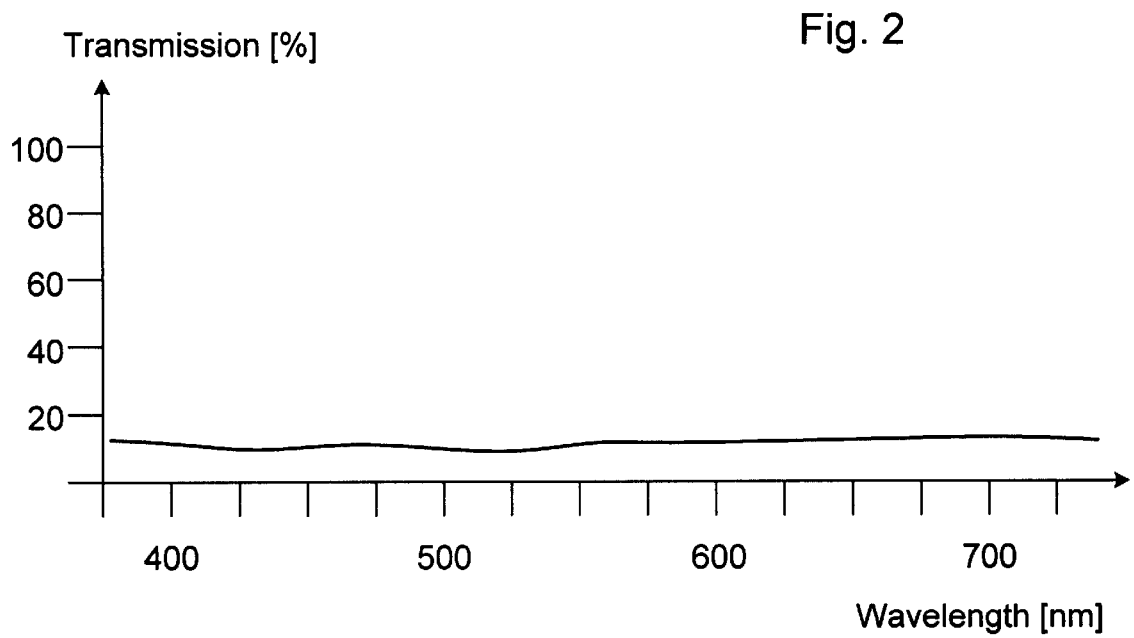
FIG. 2 is a graph of transmission as a function of wavelength over the visual spectral region for the thin-layer system according to the present invention.
Figure 3:
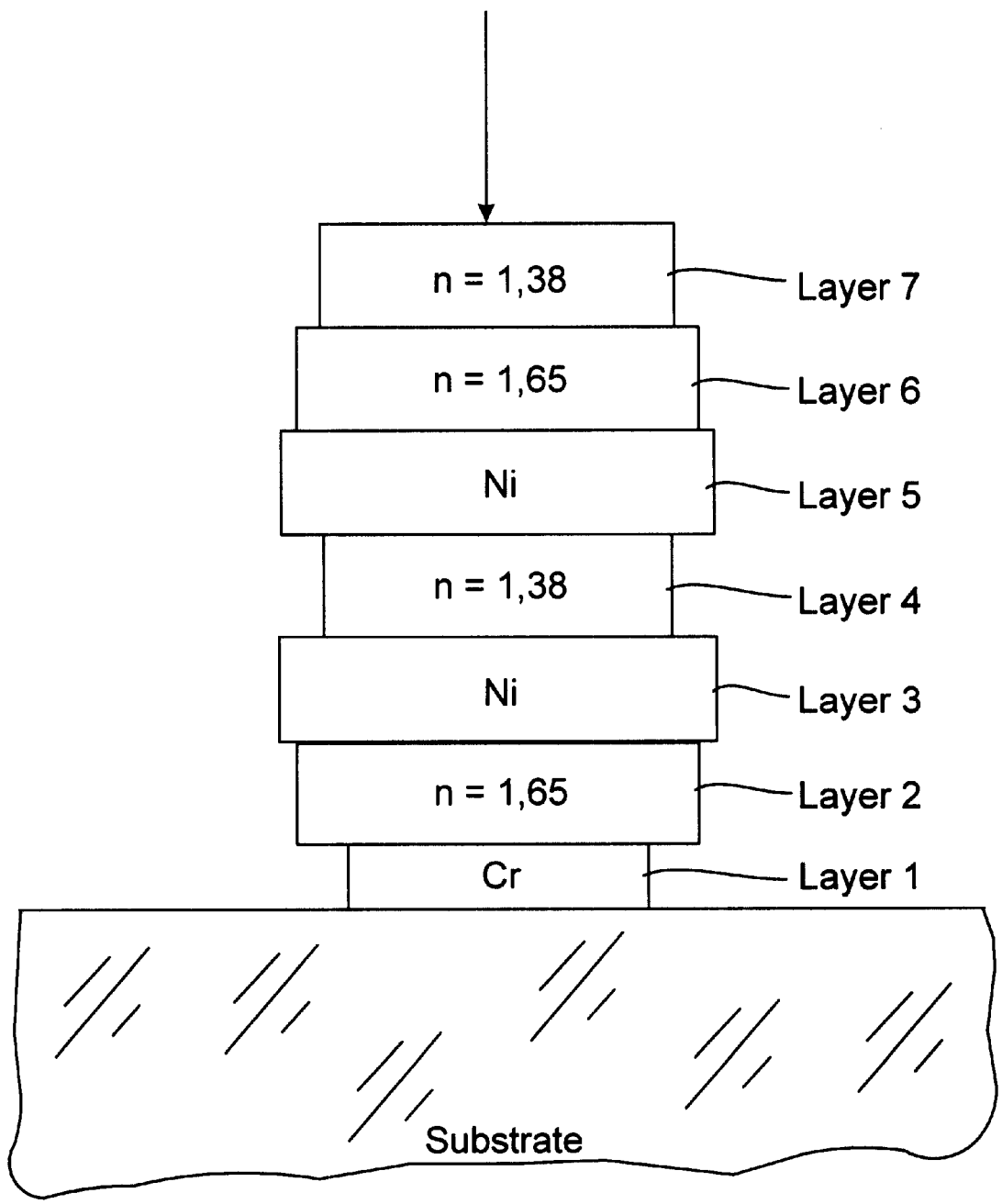
FIG. 3 shows the structure of the thin-layer system of the present invention.

FIG. 2 shows the residual reflectivity as a function of the wavelength over the visual spectral region for the thin-layer system according to the invention. It can be seen that the reflectivity varies only between 0.8% and 2.0%. Additionally, it should be further appreciated that residual reflectivity is less than that of an uncoated glass (carrier) plate and between 0.8 and 2.0%.

FIG. 2 shows the transmittance as a function of the wavelength for a thin-layer system according to the invention. As can be seen, the transmittance is between 8% and 12% across the visual spectral region.

The thin-layer system according to the invention is cemented between two glass plates. The relative proportions of the total thicknesses of all the layers in the set control the balance of transmittance values between the ends of the spectral range. One preferred application of this layer system according to the invention is in the field of microscopy, with corresponding contrasting systems and procedures.

What is claimed is:

1. An absorbing thin-layer system comprising a glass plate substrate, a first layer of chromium approximately 0.68±5% nm thick applied to said substrate, a second layer of mixture M2 approximately 32.30±5% nm thick having a refractive index 1.65 5% applied to said first layer, a third layer of nickel approximately 4.45±5% nm thick applied to said second layer, a fourth layer of magnesium fluoride approximately 57.31±5% nm thick having a refractive index 1.38±5% applied to said third layer, a fifth layer of nickel approximately 1.89±5% nm thick applied to said fourth layer, a sixth layer of mixture M2 approximately 37.14±5% nm thick having a refractive index 1.65 applied to said fifth layer, and a seventh layer of magnesium fluoride approximately 111.64 nm thick having a refractive index 1.38 applied to said sixth layer.

2. The thin-layer system according to claim 1, wherein the thicknesses and refractive indices of said first through seventh layers are exactly the mean values within the ±5% limits of the corresponding values given in claim 1.

3. The invention of claim 1 wherein said first through seventh layers are operatively arranged between a pair of glass plates and the transmittance is from 8% to 12%.

4. The invention of claim 3 wherein the residual reflectivity is less than that of one of said pair of glass plates.

5. The invention of claim 4 wherein said residual reflectivity is from 0.8% to 2.0%.

6. An absorbing thin-layer system comprising a first layer of chromium approximately 0.68±10% nm thick applied to a substrate, a second layer of mixture M2 approximately 32.30±10% nm thick having a refractive index 1.65±5% applied to said first layer, a third layer of nickel approximately 4.45±10% nm thick applied to said second layer, a fourth layer of magnesium fluoride approximately 57.31±10% nm thick having a refractive index 1.38±5% applied to said third layer, a fifth layer of nickel approximately 1.89±10% nm thick applied to said fourth layer, a sixth layer of mixture M2 approximately 37.14±10% nm thick having a refractive index 1.65±5% applied to said fifth layer, and a seventh layer of magnesium fluoride approximately 111.64 nm±10% thick having a refractive index 1.38±5% applied to said sixth layer.

7. The invention of claim 6 wherein said thin-layer system is placed between a pair of glass plates and the transmittance is from 8% to 12%.

8. The invention of claim 7 wherein the residual reflectivity is less than one of said pair of glass plates.

9. The invention of claim 8 wherein said residual reflectivity is from 0.8 to 2.0%.

10. A thin layer system having a zero degree phase shift and a residual reflectivity not greater than 10%, said thin layer system comprising:

a first layer of chromium having a first thickness applied to a substrate;

a second layer of mixture M2, said second layer applied to said first layer and having a refractive index of 1.65±5%, said second layer having a second thickness wherein the proportional thickness of said second layer to said first layer is 32.3±10% nm to 0.68±10% nm;

a third layer of nickel having a third thickness applied to said second layer wherein the proportional thickness of said third layer to said second layer is 4.45±10% nm to 32.3±10% nm;

a fourth layer of magnesium fluoride having a fourth thickness and a refractive index of 1.38±5% applied to said third layer wherein the proportional thickness of said fourth layer to said third layer is 57.31±10% nm to 4.45±10% nm;

a fifth layer of nickel having a fifth thickness applied to said fourth layer wherein the proportional thickness of said fifth layer to said fourth layer is 1.89±10% nm to 57.31±10% nm;

a sixth layer of mixture M2 having a sixth thickness and having a refractive index of 1.65±5% applied to said fifth layer wherein the proportional thickness of said sixth layer to said fifth layer is 37.14±10% nm to 1.89±10% nm; and, a seventh layer of magnesium fluoride having a seventh thickness and a refractive index of 1.38±5% and applied to said sixth layer wherein the proportional thickness of said seventh layer to said sixth layer is 111.64±10% nm to 37.14±10% nm.

\* \* \* \* \*

UNITED STATES PATENT AND TRADEMARK OFFICE
CERTIFICATE OF CORRECTION

PATENT NO.    : 6,627,304 B1  Page 1 of 1
DATED         : September 30, 2003
INVENTOR(S)   : Eisenkramer It is certified that error appears in the above-identified patent and that said Letters Patent is hereby corrected as shown below:

Column 1,
Line 66, the chemical formula "$La0.5_xAl_{1.5}$ O" should be corrected to -- $La0.5\ Al1.5\ O3$ --.

Column 2,
Line 4, the figure "1.65 5%" should be corrected to -- 1.65 +/- 5% --.

Signed and Sealed this

Sixteenth Day of March, 2004

JON W. DUDAS
*Acting Director of the United States Patent and Trademark Office*